(12) United States Patent
Iida

(10) Patent No.: US 12,718,529 B2
(45) Date of Patent: Aug. 25, 2026

(54) MEDICAL IMAGE LEARNING METHOD, MEDICAL IMAGE LEARNING APPARATUS, AND STORAGE MEDIUM

(71) Applicant: Konica Minolta, Inc., Tokyo (JP)

(72) Inventor: Nodoka Iida, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 575 days.

(21) Appl. No.: 18/167,480

(22) Filed: Feb. 10, 2023

(65) Prior Publication Data

US 2023/0260258 A1 Aug. 17, 2023

(30) Foreign Application Priority Data

Feb. 15, 2022 (JP) ................................ 2022-020970

(51) Int. Cl.

| | |
|---|---|
| ***G06T 7/00*** | (2017.01) |
| ***G06V 10/774*** | (2022.01) |
| ***G06V 10/82*** | (2022.01) |

(52) U.S. Cl.

CPC .......... *G06V 10/774* (2022.01); *G06T 7/0012* (2013.01); *G06V 10/82* (2022.01); *G06T 2207/20081* (2013.01); *G06T 2207/20084* (2013.01); *G06T 2207/30096* (2013.01); *G06V 2201/03* (2022.01); *G06V 2201/07* (2022.01)

(58) Field of Classification Search

CPC .. G06V 10/774; G06V 10/82; G06V 2201/03; G06V 2201/07; G06T 7/0012; G06T 2207/20081; G06T 2207/20084; G06T 2207/30096; G06T 2207/10072; G06T 2207/10116

See application file for complete search history.

(56) References Cited

U.S. PATENT DOCUMENTS

2016/0364857 A1* 12/2016 Reicher ................. G06T 7/0012
2018/0060722 A1* 3/2018 Hwang .................. G06N 3/045
2018/0144466 A1* 5/2018 Hsieh .................... G06T 7/0012
2019/0272640 A1* 9/2019 Sugahara ............. G06V 10/776
2021/0019551 A1* 1/2021 Yan ........................ G16H 30/40
2023/0041804 A1* 2/2023 Muller .................. G06T 7/0016
2023/0052078 A1* 2/2023 Annangi .............. G06V 10/778
2023/0116897 A1* 4/2023 Hosseinzadeh Taher .................. G06V 10/774 382/156
2023/0215003 A1* 7/2023 Tsujimoto ........... G06N 3/0475 382/128

(Continued)

FOREIGN PATENT DOCUMENTS

JP 2021-524083 A 9/2021

*Primary Examiner* — Van D Huynh

(74) *Attorney, Agent, or Firm* — LUCAS & MERCANTI, LLP

(57) ABSTRACT

A medical image learning method includes: pre-task learning in which a model performs self-supervised learning, based on first medical image data; and target-task learning in which the model that has learned in the pre-task learning learns to detect a lesion, based on second medical image data that has a correct answer. The first medical image data includes original image data on which predetermined image processing is not performed and/or processed image data on which the predetermined image processing has been performed. The second medical image data includes the original image data.

10 Claims, 5 Drawing Sheets

(56) References Cited

U.S. PATENT DOCUMENTS

2023/0260652 A1* 8/2023 Azizi .................... G06T 7/0012
382/128
2024/0177861 A1* 5/2024 Yamane ................. G16H 15/00

* cited by examiner

MEDICAL IMAGE LEARNING METHOD, MEDICAL IMAGE LEARNING APPARATUS, AND STORAGE MEDIUM

CROSS-REFERENCE TO RELATED APPLICATIONS

The entire disclosure of Japanese Patent Application No. 2022-020970 filed on Feb. 15, 2022 is incorporated herein by reference in its entirety.

TECHNICAL FIELD

The present disclosure relates to a medical image learning method, a medical image learning apparatus, and a storage medium.

DESCRIPTION OF THE RELATED ART

With the development of machine learning, image diagnosis by doctors in medical fields has relied more on the support of the machine learning results. In machine learning, a machine is trained to learn patterns and/or correlations among a large amount of data so that the machine can perform identification, classification, and detection.

For example, JP2021-524083A proposes using deep learning to identify whether a tumor/calcification is benign or malignant, based on medical image data of patients.

In general, machine learning, especially deep learning used in JP2021-524083A, requires a large amount of data that has correct answers.

SUMMARY OF THE INVENTION

However, it is difficult to obtain a large amount of data having correct answers, especially data of medical images in which positions of detection target regions are specified at a regional level. Most of image interpretation reports and diagnosis reports written by doctors describe only rough anatomical positions of detection target regions. Therefore, it is difficult to specify detection target regions in actual medical images. In the field of developing machine learning with medical image data, costly works are performed. For example, medical images and reports are obtained from medical facilities, and multiple doctors then create correct-answer data in which positions of detection target regions are specified at a regional level.

Even if medical image data has correct answers at a regional level, most of medical image data to be retained for long periods has been processed for image interpretation (processed image data as shown in FIG. 8A). Since the image processing on images greatly differs depending on the vendor, learning based on such processed images may not secure robustness in detecting a lesion.

On the other hand, medical images on which image processing is not performed (original images), as shown in FIG. 8B, do not greatly differ among vendors. Therefore, learning based on such unprocessed medical images can secure robustness in detecting a lesion. However, medical facilities retain only the processed images for long periods and may delete original images within a few months. It is therefore difficult to obtain original images in markets.

As described above, under the present conditions, data having correct answers (correct-answer data) is difficult to obtain, and creation of such correct-answer data requires cost. Although a large amount of processed images having correct answers can be obtained, a large amount of original images having correct answers, which contribute to securing robustness of machine learning, cannot be obtained.

An object of the present invention is to increase accuracy in lesion detection, based on medical images including a small amount of learning data that has correct answers and a large amount of learning data that does not have correct answers.

To achieve at least one of the abovementioned objects, according to an aspect of the present invention, there is provided a medical image learning method including: pre-task learning in which a model performs self-supervised learning, based on first medical image data; and target-task learning in which the model that has learned in the pre-task learning learns to detect a lesion, based on second medical image data that has a correct answer, wherein the first medical image data includes original image data on which predetermined image processing is not performed and/or processed image data on which the predetermined image processing has been performed, and the second medical image data includes the original image data.

According to an aspect of the present invention, there is provided a medical image learning apparatus including a hardware processor that performs: pre-task learning in which a model performs self-supervised learning, based on first medical image data; and target-task learning in which the model that has learned in the pre-task learning learns to detect a lesion, based on second medical image data that has a correct answer, wherein the first medical image data includes original image data on which predetermined image processing is not performed and/or processed image data on which the predetermined image processing has been performed, and the second medical image data includes the original image data.

According to an aspect of the present invention, there is provided a nontransitory computer-readable storage medium storing a program that causes a computer of a medical image learning apparatus to perform: pre-task learning in which a model performs self-supervised learning, based on first medical image data and target-task learning in which the model that has learned in the pre-task learning learns to detect a lesion, based on second medical image data that has a correct answer, wherein the first medical image data includes original image data on which predetermined image processing is not performed and/or processed image data on which the predetermined image processing has been performed, and the second medical image data includes the original image data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

An embodiment of the present invention is described. However, the scope of the invention is not limited to the illustrated examples.

Figure 1:
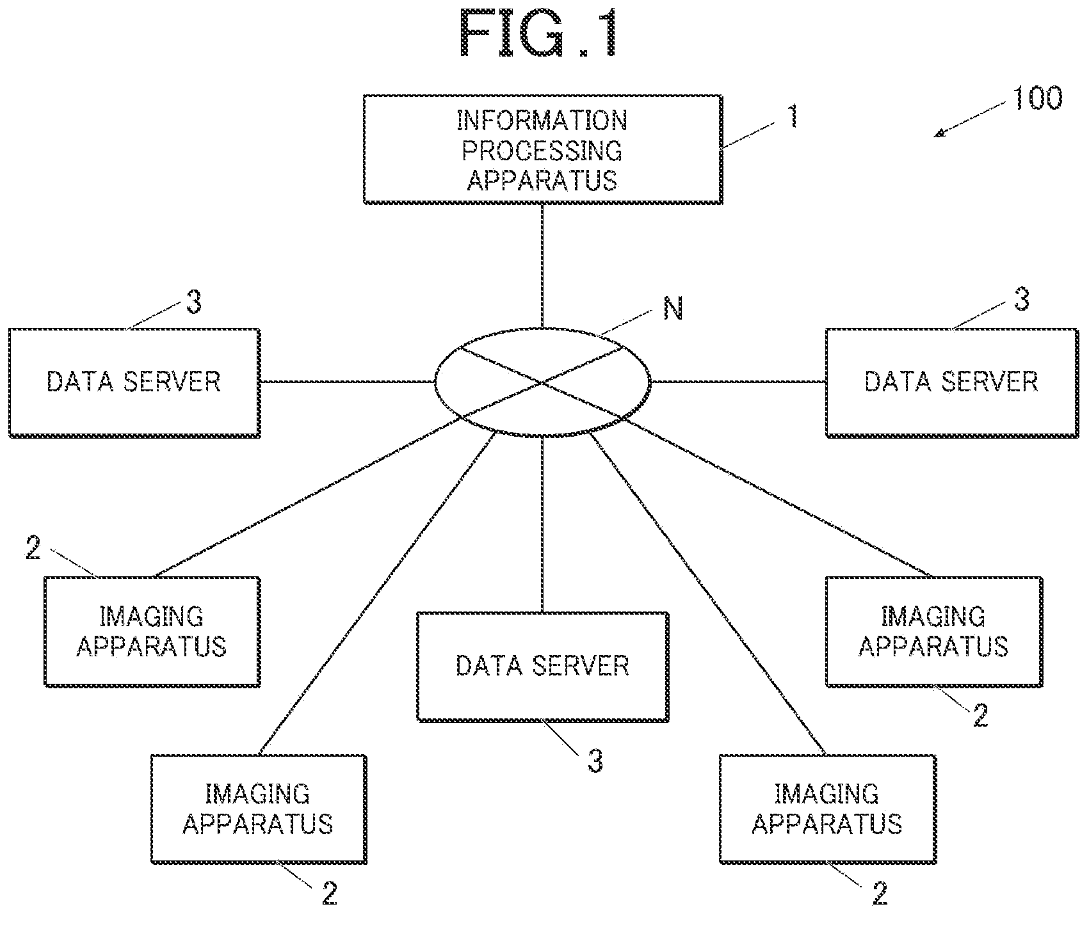
FIG. 1 is a figure to explain the entire configuration of an information system in an embodiment.

FIG. 1 is a figure to explain the entire configuration of an information system 100 in an embodiment.

The information system 100 includes an information processing apparatus 1, an imaging apparatus(es) 2, and a data server(s) 3. The imaging apparatus 2 and the data server 3 are connected to the information processing apparatus 1 over a connection network N for data communications. The communication network N may be a specific local area network (LAN) or a virtual private network (VPN). The communication network N may also be the internet, and authentication may be required for connection.

The information processing apparatus 1 is a medical image learning apparatus in this embodiment. The information processing apparatus 1 generates a machine learning model for performing image diagnosis based on obtained captured image data.

The imaging apparatus 2 is a modality that captures images and generates and outputs the captured images for medical purposes. Herein, captured images are medical images. The areas to be imaged include diagnosis target parts, such as a disease/injury part of a human body. The type of the imaging apparatus 2 may be an X-ray imaging apparatus, an ultrasonography apparatus, a magnetic resonance imaging (MRI) apparatus, or a positron emission tomography (PET) apparatus, for example. That is, the captured medical images may be mammographic images, X-ray images, ultrasound images, MRI images, or PET images. However, the type of the imaging apparatus 2 is not limited to the above. Examples of an X-ray imaging apparatus include an imaging apparatus that generates digital data by plain radiography (e.g., computed radiography (CR) and digital radiography (DR)) and an imaging apparatus that performs computed tomography (CT). There may be multiple imaging apparatuses 2 connected to the communication network N. There may be imaging apparatuses 2 of different types and imaging apparatuses 2 of the same type. The imaging apparatuses 2 of the same type may be the same model of the same manufacturer; may be models of different manufacturers; or may be different models of the same manufacturer.

The data server 3 stores and retains captured image data obtained by the imaging apparatuses 2, information on the imaging, and diagnostic information on a patient corresponding to the captured image. There may be multiple data servers 3. One data server 3 may correspond to one imaging apparatus 2, or one data server 3 may intensively store image data of multiple imaging apparatuses 2. The imaging apparatus 2 may not be directly accessible by the information processing apparatus 1 over the communication network N. The captured image data may be firstly obtained by the data server 3 and then obtained by the information processing apparatus 1 through communications between the information processing apparatus 1 and the data server 3.

[Configuration of Information Processing Apparatus 1]

Figure 2:
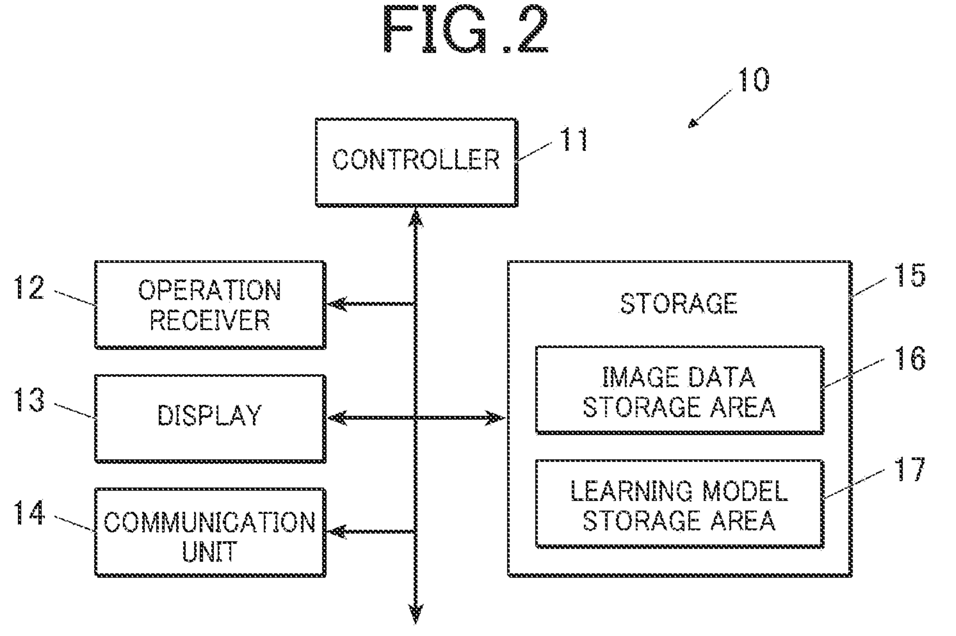
FIG. 2 is a block diagram of functional components of an information processing apparatus.

FIG. 2 is a block diagram showing functional components of the information processing apparatus 1 in this embodiment. The information processing apparatus 1 includes a controller 11 (hardware processor), an operation receiver 12, a display 13, a communication unit 14, and a storage 15. These components are connected via a bus. The information processing apparatus 1 functions as a medical image learning apparatus.

The controller 11 includes a central processing unit (CPU) and a random access memory (RAM). The controller 11 centrally controls processing operations of the components of the information processing apparatus 1. More specifically, the CPU reads various processing programs stored in the storage 15, loads them into the RAM, and performs various processes in cooperation with the programs.

The controller 11 functions as a pre-task learning unit that performs self-supervised learning, based on first medical image data, which is described later. More specifically, the controller 11 as the pre-task learning unit performs auto encoding and contrastive learning, for example.

The controller 11 also functions as a target-task learning unit that performs learning for detecting lesions, based on second medical image data, which is described later. More specifically, the controller 11 as the target-task learning unit performs learning based on augmented data (e.g., data with pseudo lesions), for example.

The operation receiver 12 includes: a keyboard including cursor keys, character entry keys, and various function keys; and a pointing device, such as a mouse. The operation receiver 12 outputs operation signals input by the manipulation of the keyboard or the mouse to the controller 11. The operation receiver 12 may consist of a touchscreen placed on the display 13 and may output operation signals corresponding to the position touched by the finger of the operator to the controller 11, for example.

The display 13 includes a monitor, such as a liquid crystal display (LCD), and displays various windows/screens in accordance with instructions of display signals input by the controller 11.

The communication unit 14 consists of a network interface, for example. The communication unit 14 sends and receives data to and from external apparatuses connected over the communication network N, such as a LAN, the wide area network (WAN), or the internet. For example, the communication unit 14 sends and receives data to and from the imaging apparatus 2 and the data server 3.

The storage 15 consists of a hard disk drive (HDD) and/or a nonvolatile semiconductor memory, for example, and stores various kinds of data. The storage 15 includes an image data storage area 16 and a learning model storage area 17.

The image data storage area 16 stores: medical image data (first medical image data and second medical image data as learning data) for learning of a learning model described later; and correct answers corresponding to part of or all of the learning data. Examples of the correct answers include diagnosis reports, presence of lesions, positions of lesions indicated by coordinates or regions, and classifications of lesions.

The first medical image data includes (i) original image data on which predetermined image processing is not performed and (ii) processed image data on which predetermined image processing has been performed. The predetermined image processing includes gradation processing, density adjustment, and contrast adjustment that are performed for the purposes of displaying and interpreting images after the images are captured. The predetermined image processing does not include superposing of pseudo lesions, which is described later.

The second medical image data includes original image data. The original image data refers to raw data immediately after imaging or image data on which only image correction processing has been performed. The second medical image data also includes original image data on which a pseudo lesion(s) has been superposed (edited original image data).

The learning model storage area 17 stores a network(s) (a learning model or a model), such as a neural network capable of performing deep learning. More specifically, the learning model storage area 17 stores a model for detecting a specific lesion. For example, the stored model may be based on U-net that can perform segmentation of regions (O. Ronneberger, P. Fischer, and T. Brox: U-net: Convolutional networks for biomedical image segmentation, in International Conference on Medical image computing and computer-assisted intervention, Springer, pp. 234-241 (2015)).

[Learning Process]

The learning process to be performed by the controller 11 is explained with reference to the flow shown in FIG. 3. The learning process uses mammographic images for screening breast cancer, as an example.

The controller 11 firstly obtains original image data that does not have correct answers (hereinafter called no-correct-answer original image data A) and processed image data that does have correct answers (hereinafter called no-correct-answer processed image data B) as learning data from the image data storage area 16 (Step S11). The no-correct-answer original image data A and the no-correct-answer processed image data B are first medical image data.

The controller 11 obtains a U-net model N1 as a learning model from the learning model storage area 17 (Step S12).

The U-net model N1 may be a model that has been trained beforehand based on a data set different from a data set to be used in the learning in this embodiment. For example, the U-net model N1 may be a model trained beforehand to perform initialization based on random values of a Gaussian distribution or a model trained using the ImageNet (data set for image recognition).

As pre-task learning, the controller 11 trains the obtained U-net model N1 to restore images by using the no-correct-answer original image data A and the no-correct-answer processed image data B (Step S13).

Figure 4:
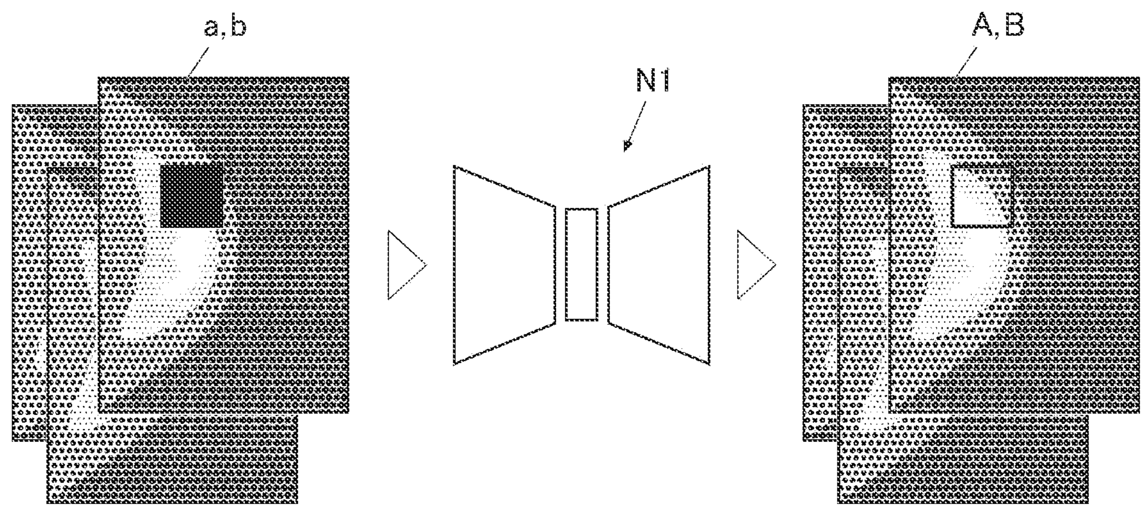
FIG. 4 shows pre-task learning.

The method of pre-task learning is described using the diagram of pre-task learning in FIG. 4. Examples of pre-task learning include learning for restoring an image, as follows.

The no-correct-answer original image data A and the no-correct-answer processed image data B are used as correct data. In the no-correct-answer original image data A and the no-correct-answer processed image data B, blacked-out portions (holes) are formed and these data are used as learning data (learning data a, learning data b). The controller 11 causes the U-net model N1 to perform self-supervised learning, or more specifically, causes the U-net model N1 to learn to restore the blacked-out portions (holes). For example, the controller 11 causes the U-net model N1 to perform self-supervised learning by using a generative adversarial network (GAN).

The blacked-out portions (holes) of the learning data a and the learning data b are automatically created by the controller 11.

The controller 11 thus causes the U-net model N1 to learn "typical mammary gland structures in mammographic images" by using a large amount of data without information on findings (data without correct answers).

Next, the controller 11 modifies the decoder part of the U-net model N1 that has learned in Step S13 (learned model) for the purpose of lesion detection (Step S14). The modified U-net model N1 is referred to as the model N2.

The encoder part of the U-net model N1 has learned feature quantities of the no-correct-answer original image data A and the no-correct-answer processed image data B. The encoder part is used as it is. On the other hand, the decoder part of the U-net model N1 is modified for lesion detection. Since the U-net model N1 has learned to restore images in Step S13, the decoder part of the U-net model N1 has one output channel for restoring images. In order to modify the U-net model N1 into a model that detects tumors and calcification, the model needs to be modified to have two output channels for detecting tumors and calcification. The modification of the decoder part may not be necessary depending on the model used.

The controller 11 obtains original image data that has correct answers (hereinafter called correct-answer original image data C, second medical image data) as learning data from the image data storage area 16 (Step S15).

As target-task learning, the controller 11 causes the model N2, into which the model N1 has been modified in Step S14 and the encoder part of which has learned based on the no-correct-answer original image data A and the no-correct-answer processed image data B, to learn to detect a lesion by using the correct-answer original image data C (data having correct answers, second medical image data) (Step S16).

For example, the controller 11 generates a pseudo lesion (s), which is described below, to increase the number of pieces of learning data (i.e., augments the data), and causes the model to learn based on the augmented data.

Figure 5:
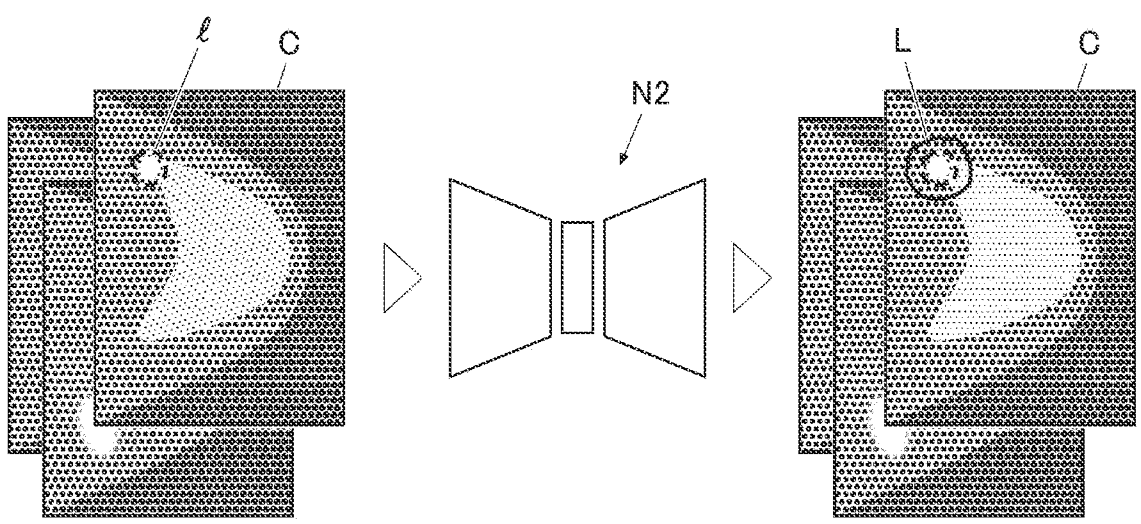
FIG. 5 shows target-task learning.

The method of target-task learning is described based on FIG. 5, which shows the diagram of learning for detecting a lesion. The controller 11 causes the learned model N2 to learn to detect a lesion part 1 enclosed by a dashed line in the correct-answer original image data C as a lesion (detected part L enclosed by a solid line).

As described above, as the pre-task learning, the controller 11 uses a large amount of data that does not have correct answers to train the model beforehand Thus, the controller 11 can increase the specificity of the model (the percentage of normal cases (negatives) that are correctly identified). Further, as the target-task learning, the controller 11 uses data that has correct answers in order to train the model to detect a lesion. Thus, the controller 11 can increase accuracy in lesion detection by the model.

[Pseudo Lesion Superposing Process]

Figure 6:
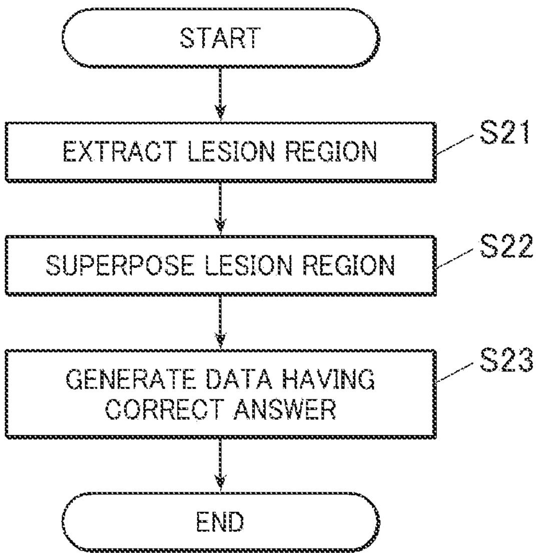
FIG. 6 is a flowchart of a pseudo lesion superposing process.

The pseudo lesion superposing process to be performed by the controller 11 is described with reference to the flow in FIG. 6. The pseudo lesion superposing process is performed by the controller 11 before Step S15 of the flow in FIG. 3.

Figure 7A:
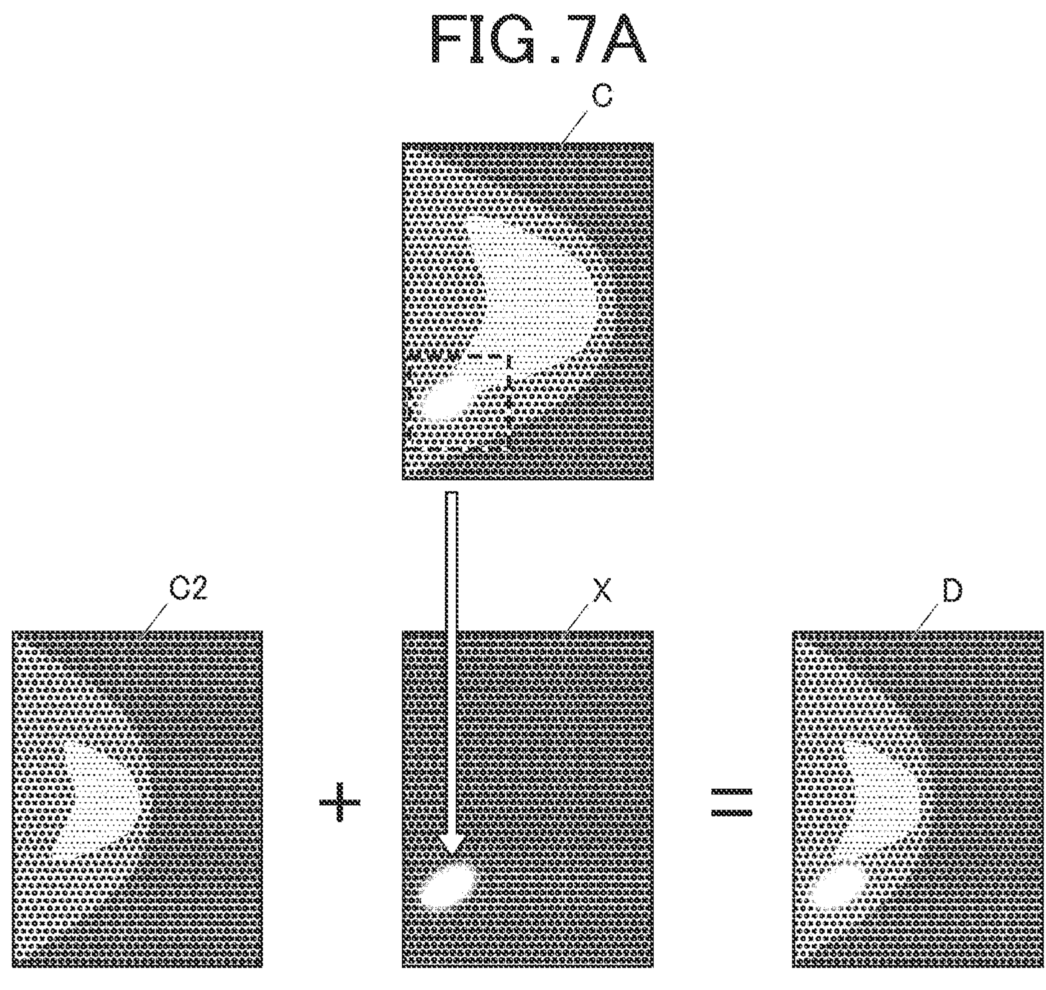
FIG. 7A shows superposing of a pseudo lesion.

The controller 11 extracts a lesion region X from an image containing a lesion in the correct-answer original image data C shown in FIG. 7A (Step S21).

The controller 11 superposes the lesion region X (pseudo lesion) on original image data C2 that is different from the correct-answer original image data C, thereby generating image data D (edited original image data) (Step S22).

The original data C2 may be original image data that has correct answers or original image data that does not have correct answers.

Figure 7B:
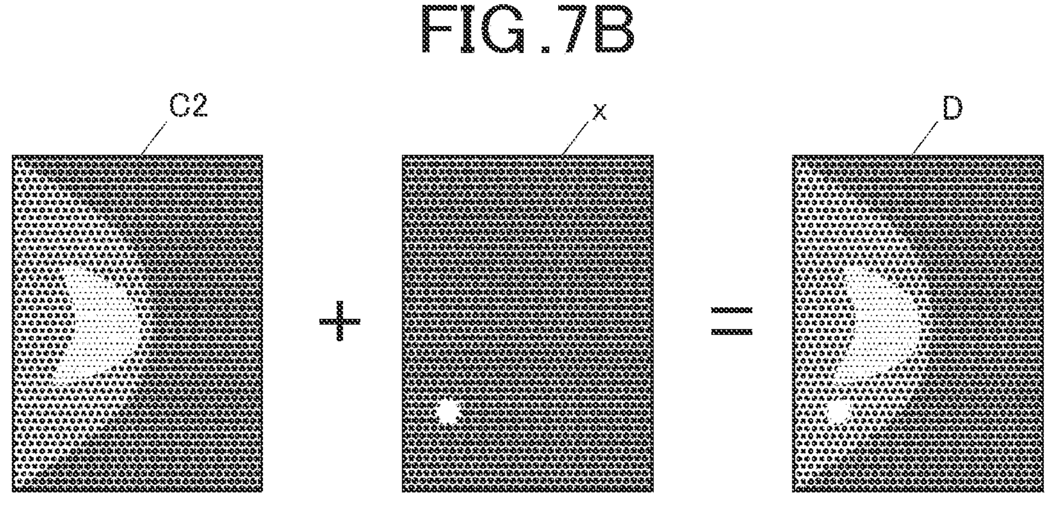
FIG. 7B shows superposing of a pseudo lesion.
Figure 8A:
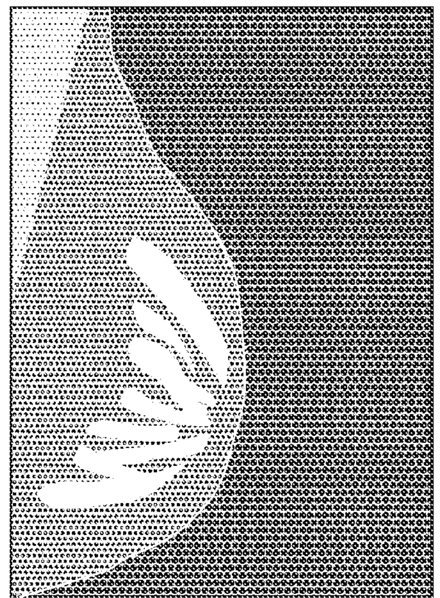
FIG. 8A is a processed mammographic image.
Figure 8B:
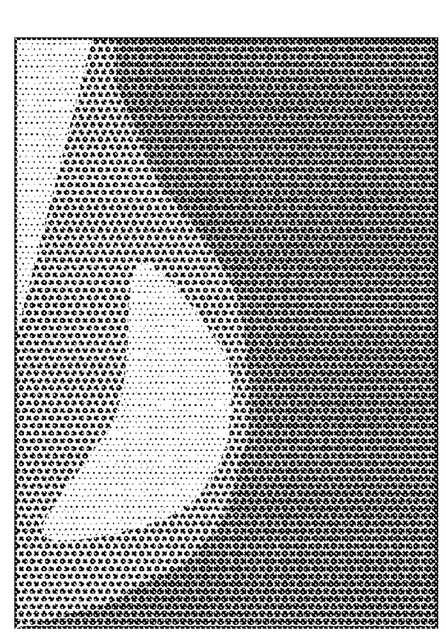
FIG. 8B is an original mammographic image.

The lesion region X (pseudo lesion) may be superposed on a region different from the lesion region X on the correct-answer original image data C. The lesion region X (pseudo lesion) may be extracted from existing image data or may be a randomly-shaped binary image on which Gaussian blur has been performed, as shown in FIG. 7B.

Based on the image data D, the controller 11 generates data having a correct answer that "the superposed lesion region X (pseudo lesion) is a lesion" and stores the generated data in the image data storage area 16 (Step S23).

Figure 3:
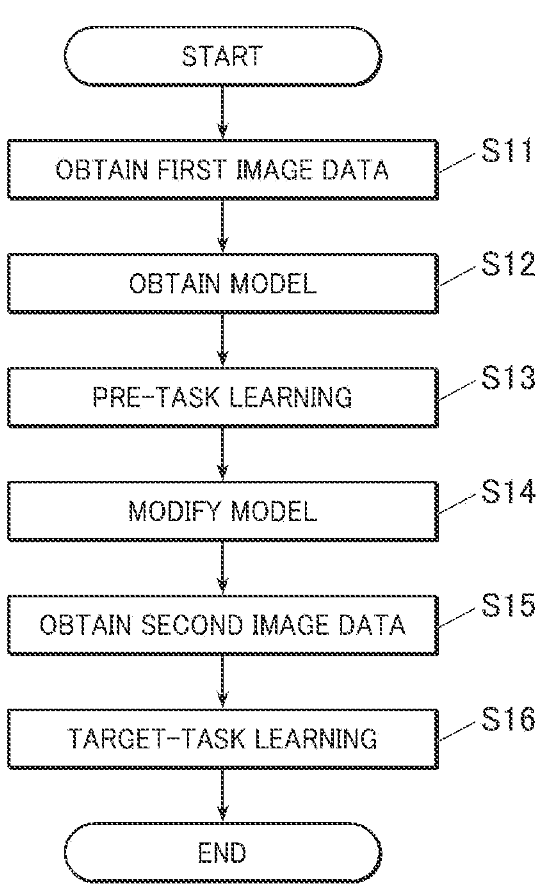
FIG. 3 is a flowchart of a learning process.

In the case where the controller 11 has performed the pseudo lesion superposing process, the controller 11 obtains the correct-answer original image data C and the image data D having correct answers (second medical image data) as learning data from the image data storage area 16 (Step S15 in the flow of the learning process in FIG. 3).

That is, the image data D as well as the correct-answer original image data C can be used as learning data that has correct answers. This increases accuracy of lesion detection by the learning model even if a small amount of data having correct answers is available.

Other Embodiments

In the above embodiment, the controller 11 performs self-encoding on the entire image in pre-task learning. However, the controller 11 may perform self-encoding on part of the image. For example, the background of a lesion in the image may not be used for learning.

In the above embodiment, the controller 11 uses the no-correct-answer original image data A and the no-correct-answer processed image data B as the first medical image data in pre-task learning. However, the controller 11 may use only either the no-correct-answer original image data A or the no-correct-answer processed image data B.

The method of learning is not limited to the self-encoding but can be any other known method. For example, an autoencoder (AE) including a variational autoencoders (VAE), a generative adversarial network (GAN), a context encoder, and contrastive learning may be used. Also, the learned model is not limited to a U-net model.

Although mammographic images for screening mammary cancer are used in the above embodiment, the present invention is not limited to this. Medical radiological images, such as chest X-ray images, may also be used. Medical images other than radiological images, such as ultrasound images, may also be used. Any medical images are applicable as long as they are used for detecting lesions.

In the above embodiment, the controller 11 obtains images, such as the no-correct-answer original image data A, the no-correct-answer processed image data B, and the correct-answer original image data C, from the storage 15. However, the present invention is not limited to this. For example, the controller 11 may obtain images stored in a storage of the imaging apparatus 2 or the data server 3 via the communication unit 14. The controller 11 may obtain images from both the storage 15 and the storage of the imaging apparatus 2 and/or the data server 3.

Advantageous Effect

As described above, the medical image learning method includes: pre-task learning in which the model performs self-supervised learning, based on first medical image data; and target-task learning in which the model that has learned in the pre-task learning learns to detect a lesion, based on second medical image data that has a correct answer, wherein the first medical image data includes original image data on which predetermined image processing is not performed and/or processed image data on which the predetermined image processing has been performed, and the second medical image data includes the original image data. According to such a method, the accuracy of lesion detection can be increased based on medical images including a small amount of learning data having correct answers and a large amount of learning data not having correct answers.

Preferably, the pre-task learning may use: an auto encoder (AE) that includes a variational auto encoder (VAE) for performing self-encoding of at least part of the first medical image data; a generative adversarial network (GAN) for generating at least part of the first medical image data; a context encoder for complementing a partial loss of the first medical image data; or contrastive learning. According to such a method, the model can learn feature quantities of target images before the target-task learning, based on medical images including a small amount of learning data having correct answers and a large amount of learning data not having correct answers. This eventually increases accuracy in lesion detection.

Preferably, the model that has learned in the pre-task learning may include an encoder and a decoder, and the method may include modifying the decoder for detecting a lesion, the modifying being before the target-task learning.

Preferably, the second medical image data may include edited original image data that is the original image data on which a pseudo lesion is superposed. This can increase accuracy in lesion detection, based on a small amount of learning data with correct answers.

Preferably, the first medical image data and the second medical image data may include radiological image data. According to this, the accuracy in detecting mammary cancer can be increased based on a small amount of learning data having correct answers, for example.

Further, the medical image learning apparatus (information processing apparatus 1) includes: the pre-task learning unit (controller 11) that causes a model to perform self-supervised learning, based on first medical image data; and the target-task learning unit (controller 11) that causes the model, which has learned in the pre-task learning, to learn to detect a lesion, based on second medical image data that has a correct answer, wherein the first medical image data includes original image data on which predetermined image processing is not performed and/or processed image data on which the predetermined image processing has been performed, and the second medical image data includes the original image data. According to such a configuration, the accuracy of lesion detection can be increased based on medical images including a small amount of learning data having correct answers and a large amount of learning data not having correct answers.

Further, a nontransitory computer-readable storage medium stores a program that causes a computer of a medical image learning apparatus (information processing apparatus 1) to perform: pre-task learning in which a model performs self-supervised learning, based on first medical image data and target-task learning in which the model that has learned in the pre-task learning learns to detect a lesion, based on second medical image data that has a correct answer, wherein the first medical image data includes original image data on which predetermined image processing is not performed and/or processed image data on which the predetermined image processing has been performed, and the second medical image data includes the original image data. According to such a program, the accuracy of lesion detection can be increased based on medical images including a small amount of learning data having correct answers and a large amount of learning data not having correct answers.

The above-described embodiment of the present invention is a preferable example and does not limit the present invention.

For example, in the above embodiment, the controller 11 of the information processing apparatus 1 performs both the pre-task learning and the target-task learning. However, the pre-task learning may be performed by an apparatus other than the information processing apparatus 1.

The pre-task learning and the target-task learning may be performed by different apparatuses.

In the above description, a hard disk and a semiconductor nonvolatile memory are disclosed as examples of the computer readable medium that stores the program of the present invention. However, the computer readable medium is not limited to these examples. As other computer readable media, a portable storage medium, such as a CD-ROM, can be used. Further, as a medium to provide data of the program of the present invention over a communication line, a carrier wave can be used.

Other detailed configurations and operations of the information processing apparatus can also be appropriately modified without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A medical image learning method comprising:

pre-task learning in which a model performs self-supervised learning, based on first medical image data; and target-task learning in which the model that has learned in the pre-task learning learns to detect a lesion, based on second medical image data that has a correct answer, wherein the first medical image data includes original image data on which predetermined image processing for the purpose of displaying and interpreting an image after the image is captured is not performed and/or processed image data on which the predetermined image processing has been performed, and the second medical image data includes the original image data.

2. The method according to claim 1, wherein the pre-task learning uses:

an auto encoder (AE) that includes a variational auto encoder (VAE) for performing self-encoding of at least part of the first medical image data;

a generative adversarial network (GAN) for generating at least part of the first medical image data;

a context encoder for complementing a partial loss of the first medical image data; or contrastive learning.

3. The method according to claim 1, wherein the model that has learned in the pre-task learning includes an encoder and a decoder, and the method includes modifying the decoder for detecting a lesion, the modifying being before the target-task learning.

4. The method according to claim 1, wherein the second medical image data includes edited original image data that is the original image data on which a pseudo lesion is superposed.

5. The method according to claim 1, wherein the first medical image data and the second medical image data includes radiological image data.

6. A medical image learning apparatus comprising a hardware processor that performs:

pre-task learning in which a model performs self-supervised learning, based on first medical image data; and target-task learning in which the model that has learned in the pre-task learning learns to detect a lesion, based on second medical image data that has a correct answer, wherein the first medical image data includes original image data on which predetermined image processing for the purpose of displaying and interpreting an image after the image is captured is not performed and/or processed image data on which the predetermined image processing has been performed, and the second medical image data includes the original image data.

7. A nontransitory computer-readable storage medium storing a program that causes a computer of a medical image learning apparatus to perform:

pre-task learning in which a model performs self-supervised learning, based on first medical image data and target-task learning in which the model that has learned in the pre-task learning learns to detect a lesion, based on second medical image data that has a correct answer, wherein the first medical image data includes original image data on which predetermined image processing for the purpose of displaying and interpreting an image after the image is captured is not performed and/or processed image data on which the predetermined image processing has been performed, and the second medical image data includes the original image data.

8. The method according to claim 1, wherein the first medical image data includes the processed image data on which the predetermined image processing has been performed.

9. The method according to claim 8, wherein the first medical image data further includes the original image data on which the predetermined image processing is not performed.

10. The method according to claim 1, wherein the pre-task learning performed by the model includes learning to restore images.

* * * * *